No. 877,379.
PATENTED JAN. 21, 1908.
G. Q. SEAMAN.
TROLLEY REPLACER.
APPLICATION FILED MAR. 23, 1907.
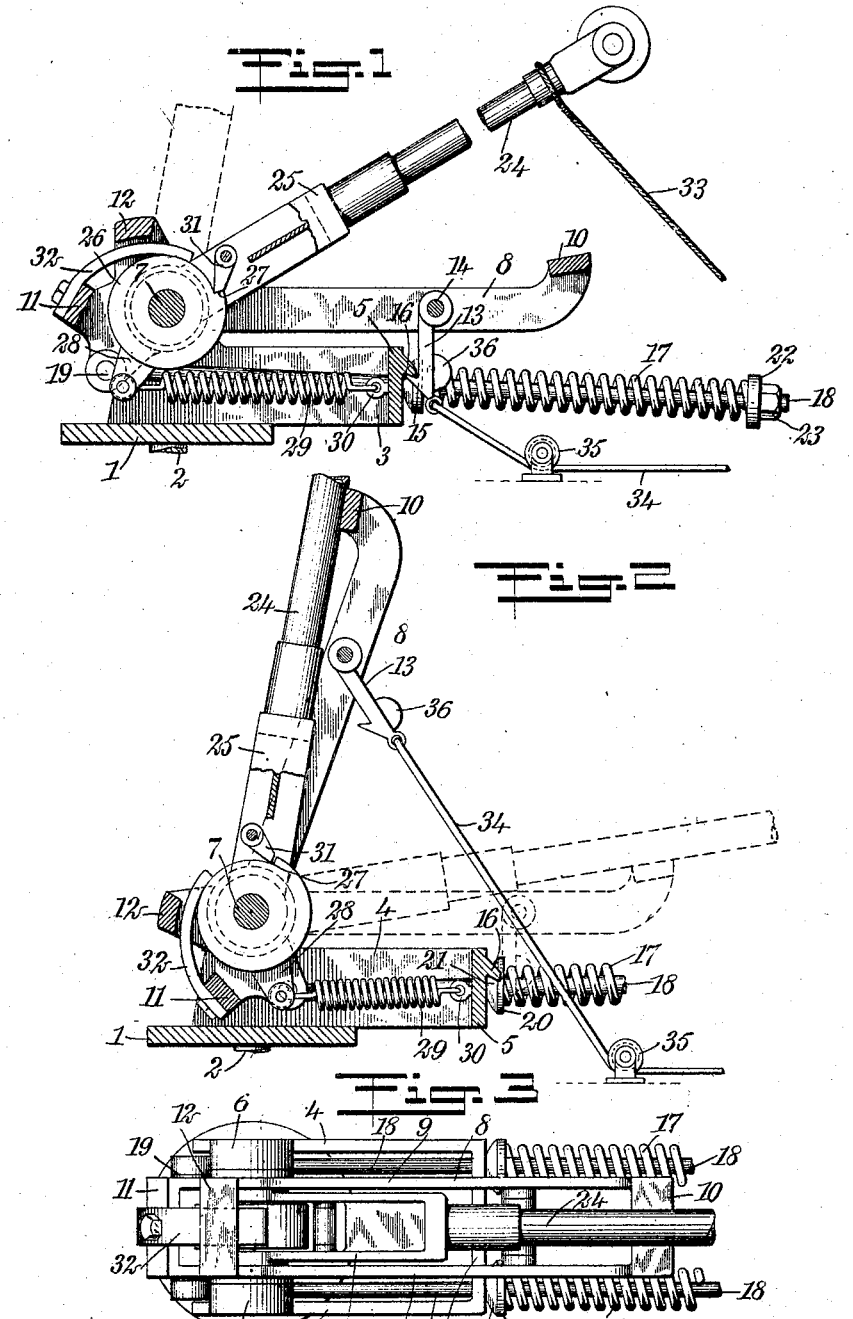
WITNESSES
INVENTOR
George Q. Seaman
BY
ATTORNEYS

UNITED STATES PATENT OFFICE.

GEORGE Q. SEAMAN, OF NEW YORK, N. Y.

TROLLEY-REPLACER.

No. 877,379.

Specification of Letters Patent.

Patented Jan. 21, 1908.

Application filed March 23, 1907. Serial No. 364,011.

*To all whom it may concern:*

Be it known that I, GEORGE Q. SEAMAN, a citizen of the United States, and a resident of the city of New York, borough of Brooklyn, in the county of Kings and State of New York, have invented a new and Improved Trolley-Replacer, of which the following is a full, clear, and exact description.

This invention relates to trolley replacers such as used in connection with the trolley poles of electric cars for replacing the trolley upon the trolley wire when it becomes accidentally displaced.

While the invention concerns itself especially with the trolley replacer, the construction is such as will operate automatically to depress the trolley pole when it becomes displaced; in this way preventing injury to the guy wires or supports.

The object of the invention is to produce a simple device, which will operate to depress the pole automatically as suggested, to enable the pole to be quickly replaced.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a vertical longitudinal section through the device, a portion of the pole being broken away; this view shows the trolley pole in substantially the position which it has when it is intact and running on the trolley wire; Fig. 2 is a vertical central section similar to Fig. 1, but representing the trolley pole in the act of being replaced on the trolley; and Fig. 3 is a plan of the parts showing them in the relation indicated in Fig. 1, the end of the pole and other parts being broken away.

Refering more particularly to the parts, 1 represents the base which is mounted, as usual, upon a swivel pin 2 on the roof of the car. This base is formed with a rearwardly extending frame 3 presenting two parallel side bars 4 and a cross bar 5. Over the base 1, which is of substantially circular form, as indicated in Fig. 3, the frame 3 is formed with bearings 6 oppositely disposed, and through these bearings there passes a transverse pin 7. Rotatably mounted on the pin 7 between the bearings 6, I provide a cradle 8, which consists of an elongated substantially rectangular frame presenting parallel side bars 9 connected by a cross head 10. The forward portion of the cradle is provided with a cross bar 11 adjacent to which there is provided a second cross bar or stop bar 12. Between the side bars 9 of the cradle, a latch 13 hangs downwardly from a suitable pivot pin 14, and this latch is provided with a tooth 15 which projects towards the cross bar 5 of the frame 3. A similar tooth 16 is provided on the outer side of the cross bar, which is adapted to be engaged by the latch so as to hold the cradle normally in a depressed position, as shown in Fig. 1. The cradle, however, is pressed toward an elevated position by springs 17 placed around draw bars 18, said draw bars being passed through guide openings in the cross bar 5, and having their forward extremities attached pivotally at 19 to the forward extremities of the side bars 9 of the cradle.

On the rear side of the cross bar 5, washers 20 are provided, against which the forward ends of the springs thrust, and these washers are formed with convex forward faces 21 which enable them to adapt themselves to changing positions of the draw bars. The outer extremities of the springs thrust against washers 22 attached respectively to the draw bars by means of suitable nuts 23. Between the side bars 9 of the cradle the trolley pole 24 is loosely mounted on the pin 7. The lower end of the trolley pole is formed with a fork 25, and between the arms of this fork there is loosely mounted on the pin 7, a trip plate 26. This trip plate is provided near its upper side, somewhat to the rear, with a shoulder 27; and on its lower side it is formed with a downwardly projecting arm 28. To this arm a helical spring 29 is attached, which extends forwardly in the frame 3, and is attached to an I-bolt 30 set in the cross bar 5 of the frame. Between the arms of the fork 25 a pawl 31 is pivoted, and this pawl is adapted to engage the shoulder 27 in the manner shown in Fig. 1, so that the trip plate will operate to hold the trolley pole normally in an elevated position. In this connection it should be understood that the spring 29 operates to support the weight of the pole.

To the forward cross bar 11 there is rigidly attached a curved dog or trigger 32, and this dog extends rearwardly so that its rear extremity lies adjacent to the periphery of the trip plate. To the upper extremity of the trolley pole 24 the main cord 33 is attached, and to the latch 13 a latch cord 34 is attached. The latch cord passes toward the rear of the car along the roof, being guided by a suitable guide pulley 35 attached to the roof of the car. The latch 13 is formed on its outer or rear face with an enlargement or counterweight 36 which facilitates the operation of the latch in a manner which will be described more fully hereinafter.

The mode of operation of the device will now be described: In Fig. 1 the parts are represented in the normal position; that is, with the trolley pole in the position which it assumes when the trolley wheel is running on the trolley wire. Suppose, now, that the trolley pole should become displaced from the trolley wire; the force of the spring 29 will immediately rotate the trip plate 26. In this way the trolley pole will swing upwardly, and the movement will continue until the rear extremity of the dog 32 strikes the pawl 31. In this way the pawl 31 will be thrown out of engagement with the shoulder 27. When this occurs, the trolley pole will no longer be supported, and it will fall into the position in which it is shown in the dotted lines in Fig. 2, resting upon the head of the cradle. It will be seen that this automatic depressing of the trolley pole is substantially instantaneous, so that the pole cannot project an appreciable time above the trolley wire. In this way I prevent any possibility of the trolley pole striking or injuring the guy wires supporting the trolley wire. When it is desired to replace the trolley pole on the trolley wire, this is accomplished by releasing the latch 13 by pulling the cord 34, which cord extends to the rear platform of the car, together with the cord 33. As soon as the latch 13 is released, the force of the springs 17 operating on the cradle, tends to raise the cradle and the pole. This upward tendency of the cradle, however, is resisted by the cord 33, which is held in the hand and paid out slowly until the pole has moved upwardly sufficiently to enable the pawl to engage the shoulder, as indicated in Fig. 2. As soon as this occurs, the trolley pole is pulled downwardly by the cord 33, carrying with it the cradle. This downward movement continues until the cradle comes into substantially the position in which it is shown in Fig. 1. The cord 34 is allowed to run slack so that the latch 13 engages automatically with the tooth 16 of the frame 3. The cradle will then become locked in its depressed position, and the cord 33 is then paid out to allow the trolley pole to move upwardly; and the cord is then used in the usual manner to replace the trolley wheel upon the wire.

From the arrangement described, it will now appear clearly that the device operates automatically to depress the pole when it becomes displaced, and may be operated in a very simple manner to replace the trolley pole on the wire and the other parts in their normal position.

Having thus described my invention, I claim as new and desire to secure by Letters Patent:

1. In a device of the class described, in combination, a base, a trolley pole pivotally mounted thereupon, means tending to force said trolley pole toward the trolley wire, automatic means for depressing said pole when displaced from the wire, and a cradle adapted to receive said trolley pole when depressed, and affording means for raising the same to its normal position.

2. In a device of the class described, in combination, a frame, a trolley pole pivotally mounted thereupon, a cradle pivotally mounted on said frame, means tending to raise said cradle, means for latching said cradle normally in a depressed position, means for automatically depressing said trolley pole when displaced from the trolley wire whereby it may descend upon said cradle, and means for releasing said cradle to enable the same to raise said pole.

3. In a device of the class described, in combination, a base, a trolley pole pivotally mounted thereupon, a cradle pivotally mounted on said base and adapted to receive said trolley pole in a depressed position, a trip plate mounted on said base, a member connecting said pole and said trip plate and affording means for supporting said pole upon said trip plate, means engaging said trip plate and affording means for holding said trolley pole in an elevated position, a dog lying adjacent to said first member and adapted to disengage the same when said trolley pole becomes displaced from the trolley wire, means tending to raise said cradle, and means for latching said cradle in a depressed position.

4. In a device of the class described, in combination, a base, a trolley pole pivotally mounted thereupon, a trip plate pivotally mounted on said base and having a shoulder, a pawl carried by said trolley pole and engaging said shoulder to enable said trip plate to support said trolley pole, a spring attached to said trip plate and affording means for normally holding said trolley pole in an elevated position, a cradle pivotally mounted on said base and having a dog adapted to engage said pawl when said trolley pole becomes detached from the trolley wire, said cradle being adapted to receive said trolley pole as it becomes depressed when said pawl is released, springs tending to move said cradle toward an elevated position, a latch for normally holding said cradle in a depressed position, a cord connecting with said trolley pole, and means for operating said latch.

In testimony whereof I have signed my name to this specification in the presence of two subscribing witnesses.

GEORGE Q. SEAMAN.

Witnesses:
EDWARD J. SHARMAN
THOMAS BELL.